US009022474B2

(12) United States Patent
Bullard

(10) Patent No.: US 9,022,474 B2
(45) Date of Patent: May 5, 2015

(54) ADJUSTABLE FOUNDATION FOR A SEATING UNIT

(75) Inventor: Larry I. Bullard, Winton-Salem, NC (US)

(73) Assignee: L&P Property Management Company, South Gate, CA (US)

( * ) Notice: Subject to any disclaimer, the term of this patent is extended or adjusted under 35 U.S.C. 154(b) by 1019 days.

(21) Appl. No.: 12/498,053

(22) Filed: Jul. 6, 2009

(65) Prior Publication Data
US 2011/0004371 A1 Jan. 6, 2011

(51) Int. Cl.
A47C 7/14 (2006.01)
B60N 2/72 (2006.01)
A47C 7/28 (2006.01)
A47C 7/30 (2006.01)
B60N 2/66 (2006.01)

(52) U.S. Cl.
CPC . B60N 2/72 (2013.01); A47C 7/285 (2013.01); A47C 7/30 (2013.01); B60N 2/66 (2013.01)

(58) Field of Classification Search
USPC .................. 297/284.1, 284.2, 284.3, 452.56
See application file for complete search history.

(56) References Cited

U.S. PATENT DOCUMENTS

| 2,822,032 | A | * | 2/1958 | Palmer ............................. 267/89 |
| 3,273,877 | A | * | 9/1966 | Geller et al. .................... 267/89 |
| 3,340,548 | A | * | 9/1967 | Janapol ............................. 5/243 |
| 4,162,063 | A | | 7/1979 | Nissen et al. |
| 4,162,807 | A | | 7/1979 | Yoshimura |
| 4,588,172 | A | | 5/1986 | Fourrey et al. |
| 4,671,569 | A | | 6/1987 | Kazaoka et al. |
| 4,682,763 | A | * | 7/1987 | Kazaoka et al. ................ 267/89 |
| 4,712,834 | A | * | 12/1987 | Warrick ..................... 297/284.2 |
| 4,811,986 | A | | 3/1989 | Hattori et al. |
| 4,858,992 | A | * | 8/1989 | LaSota ....................... 297/284.2 |
| 5,063,625 | A | | 11/1991 | Perry |
| 5,385,389 | A | * | 1/1995 | Bishai .......................... 297/339 |
| 5,490,714 | A | | 2/1996 | de Santis |
| 5,884,977 | A | * | 3/1999 | Swamy et al. ........... 297/452.52 |
| 6,616,229 | B2 | * | 9/2003 | Kuster et al. ............... 297/284.9 |

* cited by examiner

Primary Examiner — Philip Gabler
(74) Attorney, Agent, or Firm — Shook, Hardy & Bacon L.L.P.

(57) ABSTRACT

A seating unit that includes an adjustable foundation, a torque-inducing mechanism, and a base structure for interconnecting a backrest and a seat is provided. The adjustable foundation provides adjustable support for, and is controlled by, an occupant of the seating unit. The adjustable foundation includes extensible supports that each have a first and second end, and a frame assembly. The frame assembly includes a stationary member that is fixedly attached to the first ends and a drive bar that is configured to secure the second ends of the extensible supports such that longitudinal tension is generated upon rotating the drive bar with respect to the stationary member. The torque-inducing mechanism adjusts an angular position of the drive bar. In this capacity, the drive bar is configured to convert torque applied by the torque-inducing mechanism into a directional force that controls the longitudinal tension of the extensible supports.

20 Claims, 5 Drawing Sheets

ADJUSTABLE FOUNDATION FOR A SEATING UNIT

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

Embodiments of the present invention relate broadly to seating units designed to support a user's body in an essentially seated disposition. Commonly, seating units include a backrest and/or a seat that are constructed with a hardness or firmness which is invariable. By way of example, springs or coils that provide structure for a seat or a backrest of an automotive-style of seating unit will support an occupant within a specific hardness or firmness. This hardness or firmness is fixed because it is based on permanent characteristics (e.g., flexure, thickness, wind diameter, material traits) of the springs or coils. Accordingly, various occupants of the seating unit (e.g., operators of the vehicle) with individualized preferences of hardness or firmness will likely experience discomfort when sitting in the seating unit for a period of time.

Consequently, integrating an apparatus into seating units to allow for user-initiated control of the firmness of portion(s) of a seating unit would enhance the user's experience (e.g., level of comfort or support) when occupying the seating unit. Accordingly, embodiments of the present invention pertain to a novel adjustable foundation that is configured to increase or decrease the longitudinal tension in one or more extensible supports that span the adjustable foundation, where the longitudinal tension may be adjusted to achieve a level of firmness within the seating unit based on an indication provided by an occupant thereof.

BRIEF SUMMARY OF THE INVENTION

Accordingly, the present invention seeks to provide an improved seating product, which can be adapted to be integrated in essentially any type of seating unit, that changes the firmness in at least one region of the seating unit by adjusting a tension of extensible supports that span the region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

In embodiments, the novel seating product includes at least an adjustable foundation and a control system for adjusting aspects of the adjustable foundation. In one instance, the adjustable foundation includes one or more extensible supports (e.g., sinuous wire, fabric webbing, formed steel bands, and the like) that each have a first end and a second end, and a frame assembly for controlling tension of the extensible supports. In an exemplary embodiment, the frame assembly includes the following components: a forward lateral member that is fixedly attached to the first end of each of the extensible supports; a rearward lateral member that is in substantial parallel-spaced relationship with the forward lateral member; and a drive bar that is rotatably coupled to the rearward lateral member and secures the second end of the extensible supports. Accordingly, extensible supports may be placed in longitudinal tension between a fixed member of the frame assembly (e.g., the forward lateral member) and a drive bar that is configured to rotate with respect to the fixed member.

The adjustable foundation may further include the control system for adjusting the longitudinal tension retained by the extensible supports. In an exemplary embodiment, the control system includes a torque-inducing mechanism that is radially engaged to the drive bar and an electronic-control device that, upon actuation by an occupant of the seating unit, initiates operation of the torque-inducing mechanism to escalate or relax torque applied to the drive bar. In a particular configuration of the present invention, the torque-inducing mechanism is fixedly attached to the rearward lateral member and is configured to adjust an angular position of the drive bar with respect to the rearward lateral member. Accordingly, the torque-inducing mechanism may comprise, but is not limited to, one of the following arrangements: a ratchet device that, upon receipt of manual actuation, advances rotary motion of the drive bar; a linear motor for applying the torque to the drive bar by exerting a linear draw on a cable attached to the drive bar; a rotary motor with a sprocket output that is drivably engaged to a gear on the drive bar for applying torque thereto; or a direct drive motor attached directly to the drive bar.

In one instance, the control system may further include a processor that is operably coupled to the electronic-control device and the torque-inducing mechanism. Accordingly, the processor acts as an interface between an occupant of the seating unit and the adjustable foundation such that precise control over the level of firmness of the seating unit may be achieved. In an exemplary embodiment, the processor is configured with a memory functionality for storing preset levels of firmness. Generally, the processor may be capable of receiving a user-initiated actuation via the electronic-control device and initiating operation of the torque-inducing mechanism to escalate or relax torque applied to the drive bar. In one instance, during initial configuration of the processor, programming instructions may be introduced to the processor that, when implemented, install on the processor at least one preset level of firmness. Accordingly, upon subsequently receiving a user-initiated actuation via the electronic-control device, the processor may utilize its memory functionality to control the angular position of the drive bar in accordance with a corresponding preset level of firmness. In another instance, during normal operation, the processor may be configured to receive user-initiated reprogramming instructions via the electronic-control device. In response, to the reprogramming instructions, the processor may replace the stored preset level of firmness with updated presets in accordance with the reprogramming instructions.

In another embodiment, aspects of the present invention generally relate to a seating unit with a base structure that interconnects a pair of opposed arms in lateral-spaced relation if arms are assembled to the seating unit. Often, the base structure is coupled to a backrest. The seating unit may further include a seat that is interdisposed between the pair of opposed arms, if provided. In an exemplary embodiment, the seating unit includes the following: an adjustable foundation that provides adjustable support for, and is controlled by, an occupant of the seating unit; and a torque-inducing mechanism. The adjustable foundation may include a plurality of extensible supports in substantial parallel-spaced relation and a frame assembly that includes a stationary member and a drive bar that is rotatable with respect to the stationary member. Typically, the extensible supports are coupled to, and span, the stationary member and the drive bar such that longitudinal tension is retained within the extensible supports. The torque-inducing mechanism is generally configured to apply torque to the drive bar, thereby adjusting an angular position thereof. In this capacity, the drive bar consequently converts the applied torque into a directional force that controls the longitudinal tension of the extensible supports. In one instance, the frame assembly may be attached to the base structure in order to provide adjustable support below the seat. In another instance, the frame assembly may be accommodated by the backrest, thereby providing adjustable support for the back of the occupant. In embodiments of the instance where the frame is accommodated in the backrest, one or more adjustable foundations may be provided to facilitate adjustable support for a user's back when occupying the seating unit. By way of example, a first and a second adjustable foundation may be placed adjacent to each other, or layered upon one another, when positioned within the backrest or beneath a seat. These various adjustable foundations are configured to achieve both general firmness control and localized firmness control.

BRIEF DESCRIPTION OF THE SEVERAL VIEWS OF THE DRAWING

Illustrative embodiments of the present invention are described in detail below with reference to the attached drawing figures, which are incorporated by reference herein. In the accompanying drawings, which form a part of the specification and which are to be read in conjunction therewith, and in which like reference numerals are used to indicate like parts in the various views.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or varying components/materials similar to the ones described in this document, in conjunction with other present or future technologies.

Figure 1:
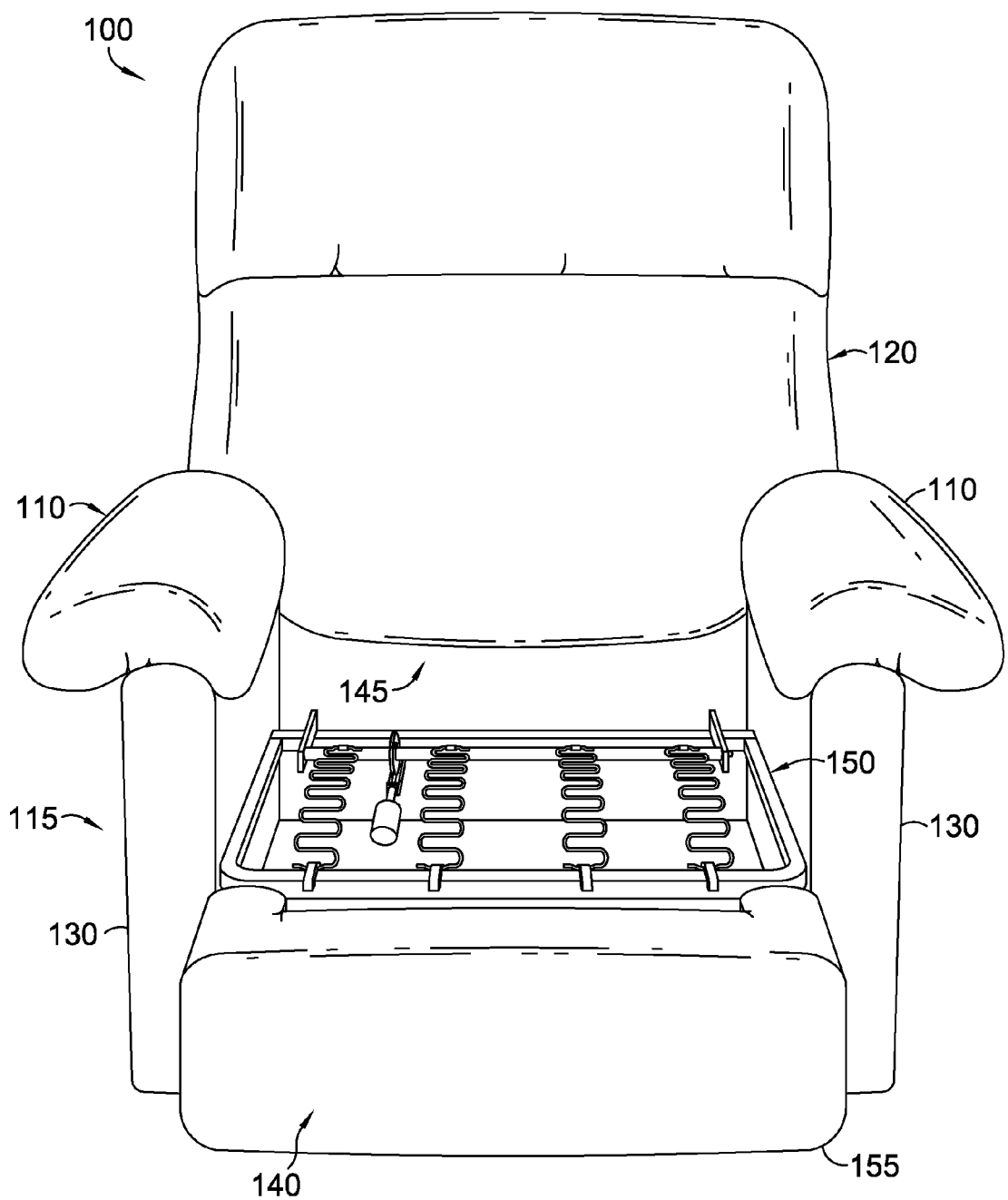
FIG. 1 is a diagrammatic exterior perspective view of a seating unit with an adjustable foundation installed and a seat removed, where the adjustable foundation is positioned according to a distinct embodiment of the present invention.

Referring to the drawings in greater detail and initially to FIG. 1, a diagrammatic exterior perspective view of a seating unit is shown and designated generally by reference numeral 100. As illustrated, the seating unit 100 has various adjustable foundations 150, 160, and 170 installed thereon, which are positioned according to distinct embodiments of the present invention. Embodiments of the present invention relate broadly to seating units designed to support a user's body in an essentially seated disposition. As utilized herein, the phrase "seating units" is not meant to be limiting, but relates broadly to apparatuses designed to support a user's body in an essentially seated disposition. By way of example, a seating unit may generally refer to recliners, incliners, sofas, love seats, sectionals, office furniture, theater seating, traditional chairs, automotive seating, motion or stationary residential seating, chairs with a moveable seat portion, and any other seating systems know by those in the relevant field.

Generally, the seating unit 100 includes a seat (not shown for purposes of explanation), a backrest 120, a foot/leg support ottoman 155, a base structure 115, and a pair of opposed arms 130. If shown, the seat (e.g., cushion-style seat) would be interposed between the pair of arms 130 and would reside above the adjustable foundation 150 and substantially forward of the backrest 120. The base structure 115 has a forward section 140, a rearward section 145, and legs (not shown), where the legs support the base structure 115 and raise it above an underlying surface (not shown). In addition, the base structure 115 is configured for vertically and laterally supporting the adjustable foundation 150, and suspending the adjustable foundation 150 above the underlying surface.

The opposed arms 130 are laterally spaced and have an arm-support surface 110 that is orientated substantially horizontally. In one embodiment, the pair of opposed arms 130 are attached to the base structure 115 via intervening members. In other embodiments, the seating unit 100 (e.g., an automotive seating system) does not include the pair of arms 130 or the support ottoman 155. The backrest 120 extends from the rearward section 145 of the base structure 115 and may be rotatably coupled thereto, typically via a linkage mechanism. The linkage system may be arranged to actuate and control movement of the backrest 120 independent of, or in conjunction with, the support ottoman 155, if provided.

Although several different configurations of the seating unit 100 having one or more adjustable foundations installed therein have been described, it should be understood and appreciated by those of ordinary skill in the art that other seating unit designs with suitable arrangements of adjustable foundations (acting independently or in conjunction with each other) may be used, and that embodiments of the present invention are not limited to those configurations described herein.

Figure 2:
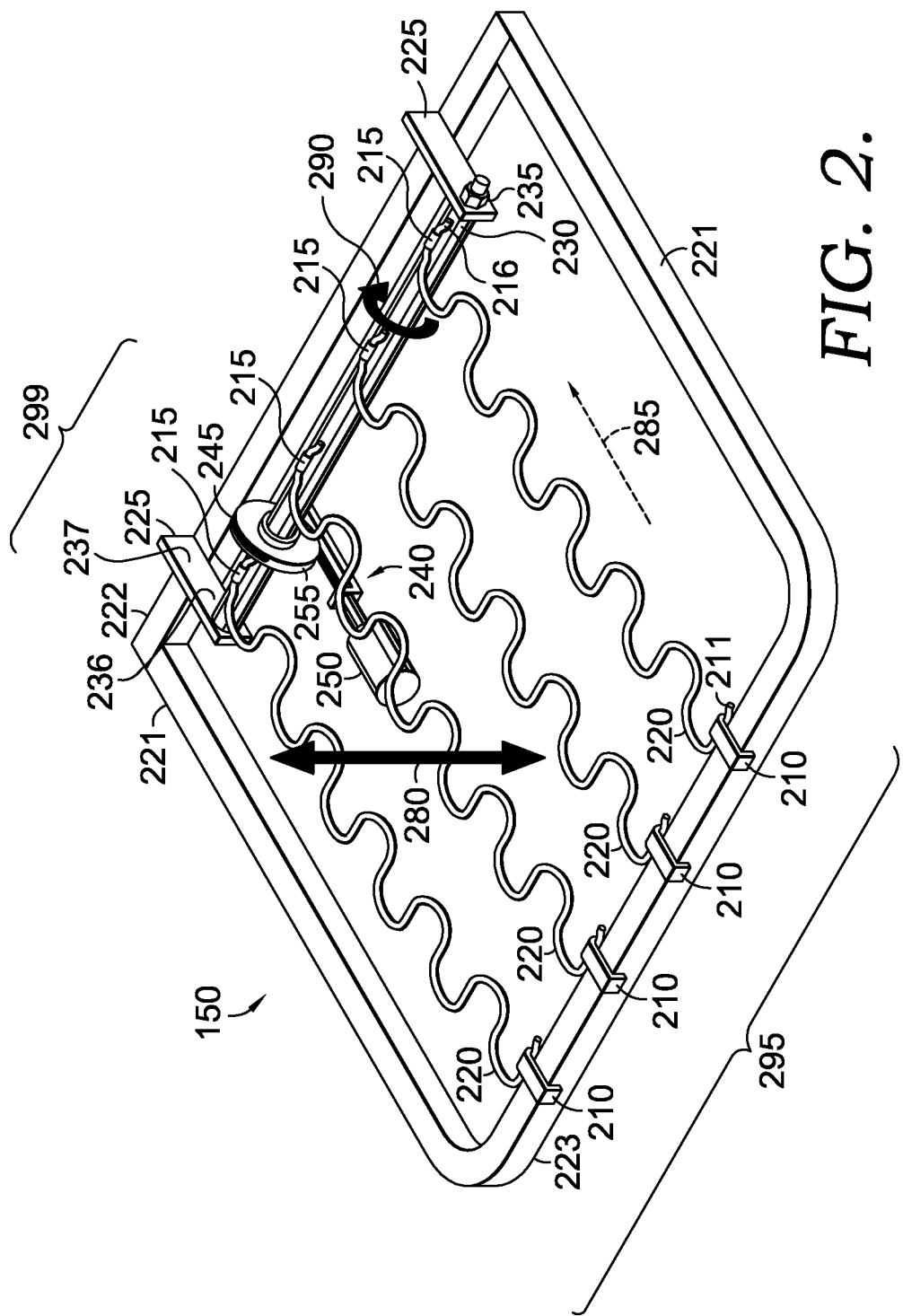
FIG. 2 is a diagrammatic perspective view of an adjustable foundation with a linear-type torque-inducing mechanism for adjusting the longitudinal tension of sinuous wire, in accordance with an embodiment of the present invention.

Turning to FIG. 2, the general structure of the adjustable foundation 150, will now be described. Initially, the adjustable foundation 150 includes one or more extensible supports configured as sinuous wires 220, and a frame assembly 295 for controlling tension of the one or more sinuous wires 220. The sinuous wires 220 may be arranged in a substantial parallel-spaced relation, whereby the sinuous wires 220 span a majority of the frame assembly 295. In other embodiments, the sinuous wires 220 may be arranged in a grid or any other pattern that, when placed under tension, influences a level of firmness 280 exhibited by the adjustable foundation 150. That is, upon applying varying amounts of tension to the sinuous wires 220, the sinuous wires 220 become softer or harder. This change in the softness or hardness of the sinuous wires 220 directly corresponds with the level of firmness 280 that is generated by the adjustable foundation 150.

By way of example only, administering tension to the sinuous wires 220 may involve extending one or more of the sinuous wires 220 along an operative-tension axis 285. Because the operative-tension axis 285 is orientated in a longitudinal direction with respect to the frame assembly 295, longitudinal tension is imparted to the sinuous wires 220 upon rotating or translating a member of the frame assembly 295 (e.g., drive bar 230). Upon escalating or relaxing the tension imparted to the sinuous wires 220, the level of firmness 280 is increased or decreased, respectively.

In an exemplary embodiment, the frame assembly 295 may include longitudinal members 221, a rearward lateral member 222, a forward lateral member 223, and a drive bar 230 rotatably coupled to the rearward lateral member 222 via pivot brackets 225. In embodiments, the pivot brackets are configured as a pair of opposed, substantially parallel-spaced, pivot brackets that each have a mounting area 236 extending from the rearward lateral member 222 and an attachment surface 237 that is fixedly attached (e.g., welded) to the rearward lateral member 222. Accordingly, the rotatable coupling between the drive bar 230 and the rearward lateral member 222 is formed by rotatably coupling the drive bar 230 to the mounting area 236 of each of the pair of opposed pivot brackets 225 such that the drive bar 230 is substantially disposed therebetween.

As depicted by FIG. 2, the rotatable coupling may be accomplished utilizing fasteners 235, which may be by hex-bolts, hex-nuts, or any other suitable fasteners which are well known in the relevant industries. Although the rotatable coupling is illustrated and described utilizing the fasteners 235 and the pivot brackets 225, it is understood and appreciated that this interconnection between the drive bar 230 and rearward lateral member 222 can take a variety of configurations, such as pivot pins, bearings, traditional mounting hardware, rivets, bolt and nut combinations, or any other suitable fasteners which are well known in the relevant industries. Further, the shapes of the brackets may vary as desired, as may the locations of certain connection or pivot points between the members 222, and 223, the pivot brackets 225, and the drive bar 230. Further, it will be understood and appreciated that when a component of the frame assembly 295 is referred to as being rotatably "coupled" to, "interconnected" with, fixedly "attached" to, etc., another element (e.g., components of a torque-inducing mechanism 240), it is contemplated that the component and elements may be in direct contact with each other, or other elements (such as intervening elements) may also be present.

In other embodiments, the rotatable coupling may, in actuality, be a translational coupling. That is, in comparison to applying tension by rotating a drive bar 230, the drive bar 230 may be adjusted in a straight-line translation that may increase or decrease the tension retained in the sinuous wires 220. For instance, the drive bar may be translated forward or rearward in the general direction of the operative-tension axis 285. In one embodiment, the components (not shown) that enable translation of the drive bar 230 may include one or more rotating screws for moveably coupling the drive bar 230 to the rearward lateral member 222. Adjustment of the rotating screws causes the extensible supports to increase in tension or relax, thereby causing the adjustable foundation 150 to increase or decrease in firmness 280.

Generally, the members 221, 222, and 223, the drive bar 230, and the pivot brackets 225 that compose the frame assembly 295 may be formed from metal stock, such as stamped, formed steel or aluminum. However, it should be understood and appreciated that any suitable rigid or sturdy material known in the relevant industry (e.g., fiberglass, plastics, wood, composites, and the like) may be used as well. For instance, the members 221, 222, and 223 may be manufactured from steel tubing or bar stock that is combined or formed to attain an appropriate shape (e.g., rectangle). Further, even though the illustrated design of the frame assembly depicts the members 221 and 223 being formed from a single piece of steel bar stock that is fixedly attached (e.g., welded) to the rearward lateral member 222, it should be understood that individual members or various combinations of members may be assembled to compose the frame assembly 295. In addition, although a rectangular shape of the frame assembly 295 is described and illustrated in FIG. 2, where the rearward lateral member 222 is in substantial parallel-spaced relationship with the forward lateral member 223, any shape, profile, or structural design is contemplated by the present invention.

Accordingly, the frame assembly 295 may be designed and built to fit within a multitude of types, models, and styles of seating units. By way of example, the frame assembly 295 may be built as a compact apparatus to fit within an automotive seating system.

In an exemplary embodiment, the drive bar 230 is pivotable about an axis. In one instance, the axis is substantially parallel with the rearward lateral member 222 or substantially perpendicular to the operative-tension axis 285. For example, the axis may be defined by the points of rotatable coupling, or fasteners 235, that rotatable couple the drive bar 230 to the opposed pivot brackets 225, as depicted by FIG. 2. But, it should be understood and appreciated that the rotatable coupling may be accomplished utilizing any other mechanism or configuration know in the relevant field and that the resultant axis of rotation of the drive bar 230 may vary accordingly to the mechanism or configuration utilized.

By way of example, the drive bar 230 may be rotatably coupled to the pivot brackets 225 such that the drive bar 230 may revolve about a central longitudinal axis (not shown). When the drive bar 230 is formed in a substantially cylindrical shape, the central longitudinal axis may align with an axis defined by the outer circumference of the drive bar 230. In addition, the points of the attachment of the sinuous wires 220 may align with the central longitudinal axis of the drive bar 230. In one instance, as illustrated in FIG. 2, the points of attachment may be attachment clips 215 to retain a second end 216 of the sinuous wires 220 such that rotational movement is allowed between each second end 216 and the drive bar 230. These attachment clips 215 are generally arranged on the drive bar 230 in a pattern that aligns with the central longitudinal axis. In this instance, a first end 211 of the sinuous wires 220 is fixedly attached to the forward lateral member 223 by attachment clips 210. Further, in this instance, the sinuous wires 220 may comprise wire that is bent in a sinusoidal form, or shaped, to hold varying degrees of tension such that a range of levels of firmness 280 may be achieved.

Figure 3:
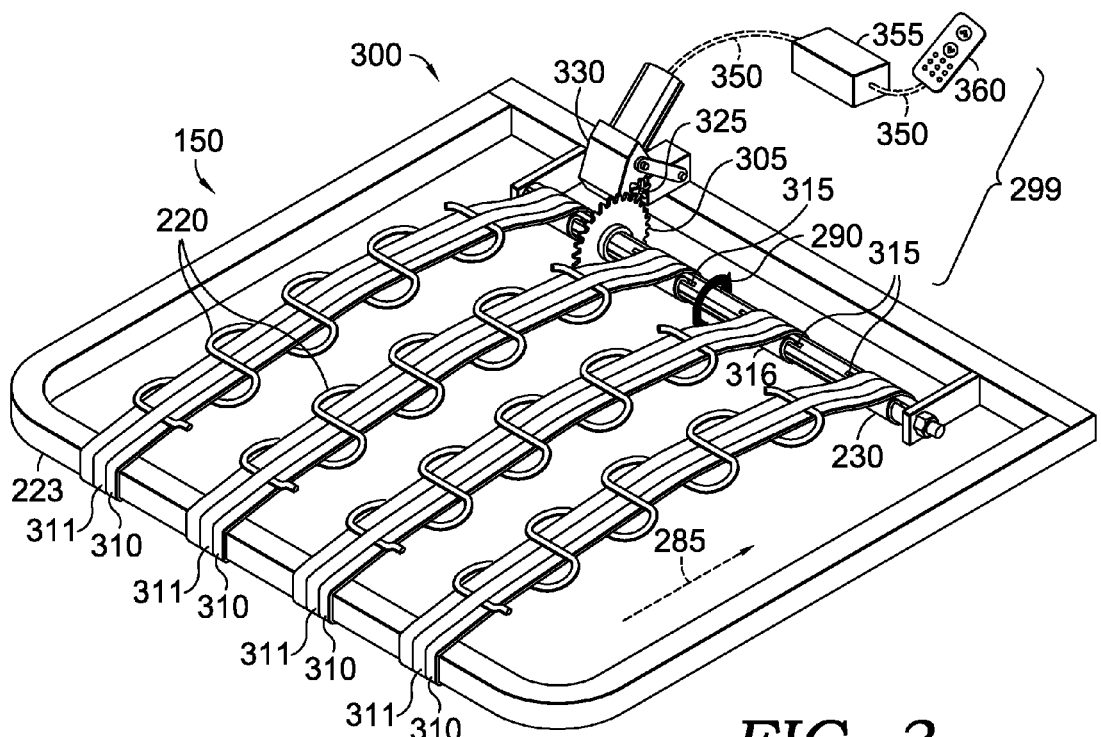
FIG. 3 is a view similar to FIG. 2, but illustrating a rotary-type torque-inducing mechanism for adjusting the longitudinal tension of sinuous wire interwoven with fabric webbing, in accordance with an embodiment of the present invention.

In another instance, as illustrated in FIG. 3, the points of attachment may be slots 315 that are longitudinally fabricated into the drive bar 230. These slots 315 are generally arranged on the drive bar 230 to align with the central longitudinal axis, and to secure a second end 316 of the extensible supports to the drive bar 230, where the extensible supports in this instance comprise fabric webbing 310 with the sinuous wire 220 integrated therewith (e.g., Sinu-Web®). In addition, the slots 315 may be formed such that their openings are in a substantial parallel-spaced relationship with the central longitudinal axis. By way of example, the slots 315 may secure the second end 316 of the webbing 310 by inserting each second end 316 into an opening defined by each of the slots 315, respectively. In this instance, a first end 311 of the webbing 310 may be fixedly attached to the forward lateral member 223 by wrapping the webbing 310 thereabout, or any other manner of making a fixed attachment between the static member of a frame and an extensible article capable of being held in tension. Further, in this instance, the webbing 310 may comprise fabric webbing that is knitted or woven from a material that, when placed under tension, may express one or more levels of firmness 280.

Figure 4:
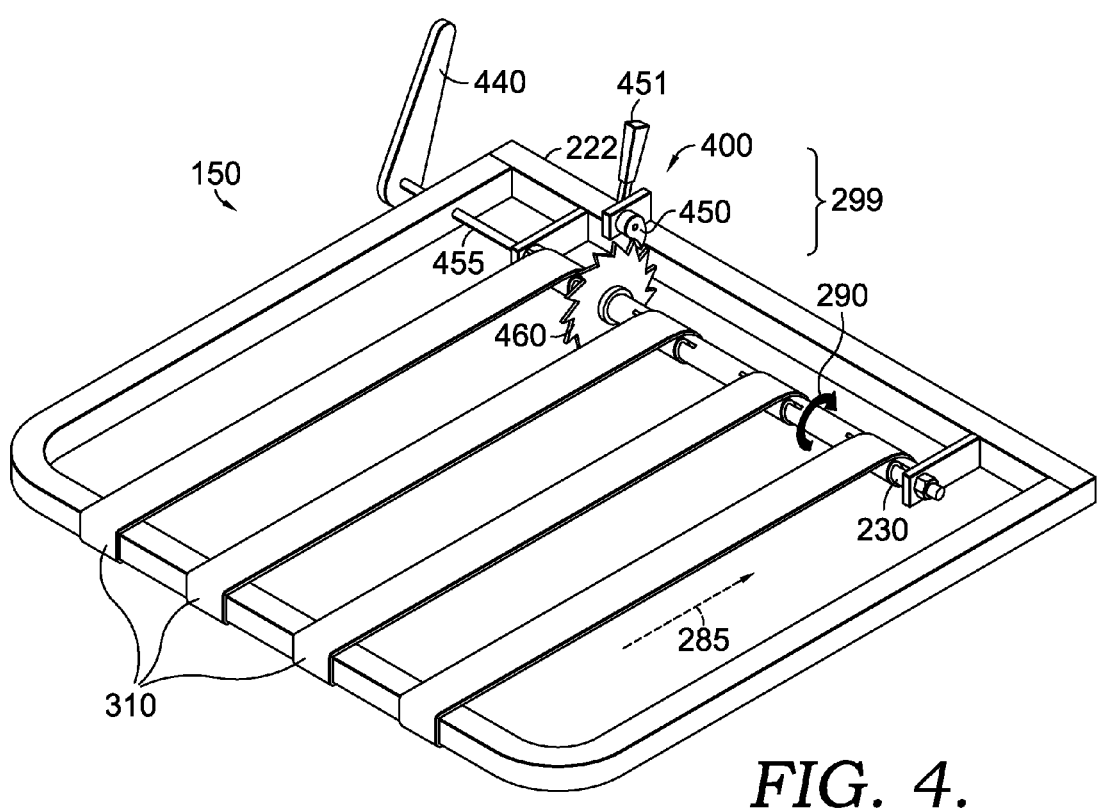
FIG. 4 is a view similar to FIG. 2, but illustrating a manually-actuated torque-inducing mechanism for adjusting the longitudinal tension of fabric webbing, in accordance with an embodiment of the present invention.

In an exemplary embodiment, the drive bar 230, as depicted by reference numeral 230 in FIGS. 2-4 may be a formed in a generally cylindrical shape. However, it should be understood that the designation of reference numeral 230 as "drive bar" is not meant to be limiting, wherein the drive bar 230 may be formed of a solid metal rod, square/hexagonal bar, or any other suitable material known to those in the relevant industry. In another embodiment, the drive bar 230 may comprise a diameter that is nonuniform such that adjustment of an angular position of the drive bar increases or decreases the longitudinal tension of the one or more extensible supports at an uneven rate. For instance, the drive bar 230 may consist of an extruded rod with an oval-shaped cross-section, as opposed to a cylindrical shape with the circular profile. Or, the drive bar 230 may consist of a nonuniform cam that may increase or decrease the tension, and accordingly the level of firmness 280, of one or more of the extensible supports and a rate that is different than the rate of adjustment for another of the extensible supports; thus, creating a zoned effect.

Although two different embodiments of the drive bar 230 have been described, it should be understood and appreciated by those of ordinary skill in the art that other types of suitable configurations that apply the tension to one or more extensible supports at one or more rates may be used, and that embodiments of the present invention are not limited to those profiles of the drive bar 230 described herein.

Further, although several different embodiments of the composition of the extensible supports have been described (e.g., sinuous wires 220 of FIG. 2, webbing 310 of FIG. 4), it should be understood and appreciated by those of ordinary skill in the art that other types of suitable material that retain varying degrees of tension and express levels of firmness 280 that correlated the degrees of tension, respectively, may be used, and that embodiments of the present invention are not limited to those compositions of the extensible supports described herein. For instance, the extensible supports may be comprised of a combination of the sinuous wire and the fabric webbing (see FIG. 3), wherein the sinuous wire is interlaced with the fabric webbing to provide additional structure thereto. In other instances, the extensible supports may be strips, panels, or sheets of elastomeric products (e.g., rubber articles), a hybrid spring and threaded webbing systems (e.g., WebRider® and Sinu-Web®), decking products (e.g., formed flat band steel), helically suspended grids, mats, elastomeric sheet-webbing materials, or helically suspended springs or coiled materials. In yet other instances, the extensible supports may comprise essentially any type of support system that will change firmness, or support characteristic, with more or less tension applied thereto.

In the embodiment where the extensible supports comprise formed flat band steel (not shown), the flat band steel may span between the forward lateral member 223 and the drive bar 230. In operation, adjustment of an angular position of the drive bar 230 causes the formed flat band steel to flex or bow, thereby varying the stiffness of the extensible supports. In the embodiment where the extensible supports comprise springs (e.g., sinusoidal springs), the springs in their relaxed state may not span the frame assembly 295, but are placed in tension by elongating the springs to reach both the front lateral member 223 and the drive bar 230. In operation, torque applied to the drive bar 230 in the direction of moment 290 will expand the springs, which increases longitudinal tension in the springs.

Turning now to FIG. 2, exemplary configurations of the control system 299, including a torque-inducing mechanism 240, will be discussed. Generally, FIG. 2 depicts a diagrammatic perspective view of the adjustable foundation 150 with an illustrative linear-type torque-inducing mechanism 240 for adjusting the longitudinal tension of extensible supports configured as sinuous wires 220, in accordance with an embodiment of the present invention. As described above, the longitudinal tension of the sinuous wires 220 is substantially aligned with the operative-tension axis 285 and generates a level of firmness 280 that is tangential to the axis 285.

As depicted, the torque-inducing mechanism 240 includes, in part, a cable 245, a pulley 255, and a linear motor 250. The linear motor 250 may be radially engaged to the drive bar 230 via the pulley 255. This radial engagement may be accomplished by engaging an outer diameter of the drive bar 230 with a centrally-located bore of the pulley 255. As illustrated in FIG. 2, an axis defining a center of the centrally-located bore may be coaxial with the central longitudinal axis of the drive bar 230. The cable 245 typically includes a first end connected to the pulley 255 and a second end that is connected to the linear motor 250. In embodiments, the pulley 255 is circumferentially engaged to a section of the cable 245. The linear motor 250 may be mounted in any direction that does not interfere with movement of the sinuous wires 220, such as a downward flexure when supporting a seated occupant of the seating unit. In one instance, the linear motor 250 is mounted to a stationary member (e.g., rearward lateral member 222) of the frame assembly 295.

Further, in operation, the linear motor 250 may facilitate applying torque to the drive bar 230 by exerting a linear draw on the cable 245. The direction of moment 290 about the central longitudinal axis diagrammatically indicates the torque applied by the torque-inducing mechanism 240 when the linear motor 250 is drawing, or pulling, the cable 245 (causing the cable 245 to unwind from the pulley 255). That is, applying torque to the drive bar 230 adjusts an angular position of the drive bar 230 with respect to the stationary member (e.g., rearward lateral member 222) of the frame assembly 295 to which the linear motor 250 and/or the balance of the seating unit, is mounted. Accordingly, the drive bar 230 is configured to convert torque applied by the torque-inducing mechanism 240 (e.g., in the direction of moment 290) into a directional force (e.g., aligned with the operative-tension axis 285) that controls the longitudinal tension of one or more extensible supports, or the sinuous wires 220. A decrease in the level of firmness of the sinuous wires 220 may be achieved by relaxing the longitudinal tension of the sinusoidal springs by feeding the cable 245 from the linear motor 250 to the pulley 255 (causing the cable 245 to wind about the pulley 255). In addition, the torque-inducing mechanism 240 may be configured to hold the drive bar 230 in a particular angular orientation with respect to the stationary member, thereby establishing a specific amount of longitudinal tension in the sinuous wires 220.

Turning now to FIG. 3, exemplary configurations of the control system 299, including the torque-inducing mechanism 300, will be discussed. Generally, FIG. 3 depicts a diagrammatic perspective view of the adjustable foundation 150 with an illustrative rotary-type torque-inducing mechanism 300 for adjusting the longitudinal tension of sinuous wire interwoven with fabric webbing (e.g., Sinu-Web®-type extensible supports), in accordance with an embodiment of the present invention. As described above, the longitudinal tension of the Sinu-Web® is substantially aligned with the operative-tension axis 285 and generates a level of firmness 280 that is tangential to the axis 285 (see FIG. 2).

As depicted, the torque-inducing mechanism 300 includes, in part, a gear 305, a rotary motor 330, and a sprocket output 325 that is drivably engaged to the gear 305. The rotary motor 330 may be radially engaged to the drive bar 230 via the gear 305. This radial engagement may be accomplished by engaging an outer diameter of the drive bar 230 with a centrally-located opening of the gear 305. As illustrated in FIG. 3, an axis defining a center of the centrally-located opening may be coaxial with the central longitudinal axis of the drive bar 230. The rotary motor 330 may be fixedly attached to a stationary member (e.g., the rearward lateral member 222 of FIG. 2) of the frame assembly 295 and may be configured to adjust an angular position of the drive bar 230 with respect to the stationary member. In particular, the rotary motor 330 may either unidirectionally or bidirectionally revolve the sprocket output 325 to adjust torque applied on the drive bar 230.

In embodiments, the exemplary configurations of the control system 299 may include an electronic-control device 360 and/or a processor for controlling operation of the torque-inducing mechanism 300. Generally, the electronic-control device 360 may, upon actuation by an occupant of the seating unit, initiate operation of the torque-inducing mechanism 300 to escalate or relax torque applied to the drive bar 230. As used herein, the phrase "electronic-control device" is not meant to be limiting but may encompass a broad range of devices that can receive an input (e.g., user-initiated actuation, automated-processor command, and the like) and relay an electrical representation of the input to the torque-inducing mechanism 300, the processor 355, or another electrical-based unit. By way of example, the electronic-control device 360 may be a switch (e.g., various-position rocker switch), a hand wand, a control pad built into a section of the seating unit (e.g., consol controls, rocker switch in the armrest 110 of FIG. 1), or any other input device for electrically controlling a motor (e.g., the rotary motor 330). In embodiments where the electronic-control device 360 comprises a wand, the wand may serve as an integrated tool that can also control the vibration, inclination, etc., of the seating unit. As such, the electronic-control device 360 can enable the occupant of the seating unit to adjust the seating comfort (e.g., level of firmness of a seat and/or a backrest) to his/her personal preference.

Although various configurations of the electronic-control device 360 have been described, it should be understood and appreciated by those of ordinary skill in the art that other types of suitable devices that provide the electric inputs may be used, and that embodiments of the present invention are not limited to those electronic-control devices described herein. For instance, the electronic-control device 360 may include such illustrative devices as a mouse, a joystick, a key pad, a microphone, or any other component capable of receiving a user-initiated actuation and communicating an indication of that input.

In exemplary embodiments, the control system 299 may include the processor 355. The processor may be mounted to the frame assembly (see reference numeral 295 of FIG. 2), to the seating unit, or may be remotely located with respect to the seating unit. For instance, if the seating unit comprises an automotive seating system installed in a vehicle, the processor 355 may be located in a server that is accessible via a wireless connection, as more fully discussed below. Generally, the processor 355 is operably coupled to the electronic-control device 360 and the torque-inducing mechanism 300 and acts as an interface therebetween.

Typically, the processor 355 serves as a computing unit (e.g., central processing unit (CPU), microprocessor, etc.) to support operations of the torque-inducing mechanism 300, or any torque-inducing mechanism, as well as software component(s) running thereon. As utilized herein, the term "processor" generally refers to a dedicated computing device with processing power and storage memory, which supports operating software that underlies the execution of software, applications, and computer programs residing thereon. In one instance, the processor 355 is configured with tangible hardware elements. In another instance, the processor 355 may encompass a processing unit coupled to computer-storage medium. Generally, the computer-storage medium stores, at least temporarily, a plurality of computer software components (e.g., programs) that are executable by the processing unit. As utilized herein, the phrase "processing unit" is not meant to be limiting and may encompass any elements of the processor 355 that act in a computational capacity. In such capacity, the processing unit may be configured as a tangible article that processes instructions. In an exemplary embodiment, processing may involve, at least one of, receiving an input from the electronic-control device 360, inspecting the input, comparing the input against programming instructions stored in the computer-storage media, and providing an output to a torque-inducing mechanism in accordance with the comparison. By way of example, where the programming instructions include at least one preset level of firmness, providing the output to the torque-inducing mechanism may include instructing the torque-inducing mechanism 300 to control the angular position of the drive bar 230 in accordance with the preset level of firmness.

Also, beyond processing instructions, the processor 355 may transfer information to and from devices (e.g., electronic-control device 360, the torque-inducing mechanism 300, and the like) that are encompassed within the control system 299. Transferring information may include communicating over connections 350. These connections 350 of the exemplary control system 299 may be utilized to interconnect devices 330 and 360 by any method known in the relevant field. For instance, the interconnection may be an operable coupling via a distributed computing environment that includes multiple computing devices coupled with one another via one or more networks. In embodiments, the network (not shown) may include, without limitation, one or more local area networks (LANs) and/or wide area networks (WANs). Such networking environments are commonplace in offices, enterprise-wide computer networks, intranets, and the Internet. Accordingly, the network is not further described herein.

In embodiments, the connections 350 allow the processor 355 to receive programming instructions from the electronic-control device 360. These programming instructions may be stored at memory functionality (e.g., computer-storage media) of the processor 355. The programming instructions may include at least one preset level of firmness. This preset level of firmness may be established during initial set-up of the processor 355 or at a later time, such as upon receiving user-initiated reprogramming instructions at the processor 355 via the electronic-control device 360. These reprogramming instructions may facilitate replacing the stored preset level(s) of firmness with updated presets in accordance with the reprogramming instructions. In other embodiments, the connections 350 allow the processor 355 to control the torque-inducing mechanism 300, based on the programming instructions, upon receiving an input (e.g., representation of the user-initiated actuation) from the electronic-control device 360. In other embodiments, the processor 355 may be programmed to automatically manipulate the torque on the drive bar 230 via the torque-inducing mechanism 300 in accordance with environmental factors (e.g., weight of the occupant, elasticity of the extensible supports, speed of the truck, etc.) beyond the direct control of a user of the electronic-control device 360.

In one embodiment, the programming instructions may set a range of rotation of the drive bar 230, which corresponds with a range of predefined levels of firmness, with respect to the type of extensible supports being used. This enables the processor 355 to set as much or as little rotation as desired to match characteristics of the chosen extensible supports. In one example, if the extensible supports are formed of the sinuous wires 220 of FIG. 2, the processor 355 may be programmed to instruct the torque-inducing mechanism 300 to apply sufficient torque to the drive bar 230 so that it is angularly positioned in a range of about one-quarter turn (90 degrees), such that the sinuous wire 220 will cycle through about a one-half inch range of stretch. Accordingly, this range of stretch will allow for a change from a softest to a firmest desirable seating comfort.

In another example, if extensible supports comprise the fabric webbing 310 of FIG. 3, the processor 355 may be programmed to instruct the torque-inducing mechanism 300 to apply sufficient torque to the drive bar 230 so that it is angularly positioned in a range of about two turns (720 degrees), such that the fabric webbing 310 will cycle through about 6 inches of stretch. Accordingly, this amount of stretch will allow for a change from a softest to a firmest desirable seating comfort and corresponds to predefined levels of firmness.

Alternatively, manual activation of the control system 299 may be implemented. An exemplary embodiment of a manual activation of a torque-inducing mechanism (e.g., torque-inducing mechanism 400) will now be discussed with reference to FIG. 4. Generally, FIG. 4 depicts a diagrammatic perspective view of the adjustable foundation 150 with an illustrative manually-actuated-type torque-inducing mechanism 440 for adjusting the longitudinal tension of extensible supports configured as the fabric webbing 310, in accordance with an embodiment of the present invention. As described above, the longitudinal tension of the fabric webbing 310 is substantially aligned with the operative-tension axis 285 and generates a level of firmness that is tangential to the axis 285.

As depicted, the torque-inducing mechanism 400 includes, in part, a ratchet device that, upon receipt of manual actuation, advances rotary motion of the drive bar 230. Accordingly, the manual actuation directly and mechanically escalates or relaxes torque applied to the webbing 310. In embodiments, the ratchet device includes a gearwheel 460, a finger 450 that is typically spring-loaded, a lever 440 for setting the ratchet device to a particular torque via one or more links 455, and a level 451 for releasing the finger 450 and relaxing tension of the webbing 310. The drive bar 230 may be radially engaged to a stationary member of the frame assembly (reference numeral 295 of FIG. 2) via the gearwheel 460 and the finger 450. The gearwheel 460 may include a centrally-located opening that is radially engaged to the drive bar 230. Further, the gearwheel 460 may include radially directed teeth. The spring-loaded finger 450 may be mounted in any direction that does not interfere with movement of the webbing 310 and may be mounted to the stationary member of the frame assembly (reference numeral 295 of FIG. 2). Mounting may comprise pivotably coupling the finger 450 to the rear lateral member 295 of FIG. 2 such that the finger 450 engages with the teeth of the gearwheel 460 to prevent unintended rotary motion of drive bar 230.

Further, in operation, the lever 440 may facilitate applying torque to the drive bar 230 by exerting a rotational force through the central longitudinal axis of the drive bar 230. The direction of moment 290 about the central longitudinal axis indicates the torque applied by the lever 440 when increasing an application of torque. The lever 440 may be pivotably coupled to a linkage within the seating unit, or may be exposed to the occupant of the seating unit for direct actuation by the occupant. For instance, the lever 440 may comprise a handle crank accessible to the occupant (e.g., through the side of one of the arms 130 of the seating unit 100 of FIG. 1) moveable between different predefined positions. In contrast, the lever 451 may facilitate reducing torque on the drive bar 230 by releasing the engagement of the finger 450 to the teeth of the gearwheel 460; thus, allowing the drive bar 230 to rotate in a direction that relaxes tension in the webbing 310. In other embodiments, the lever 451 may be configured as any release mechanism that is configured to disengage a ratchet-holding lever, or the finger 450, in order to reduce or release the tension on the extensible supports.

Although many different configurations of the torque-inducing device (e.g., reference numerals 240, 300, and 400) have been described, it should be understood and appreciated by those of ordinary skill in the art that other types of suitable devices that increase, decrease, or retain longitudinal tension in the extensible supports by rotating or translating the drive bar 230 may be used, and that embodiments of the present invention are not limited to those torque-inducing devices described herein.

Figure 5:
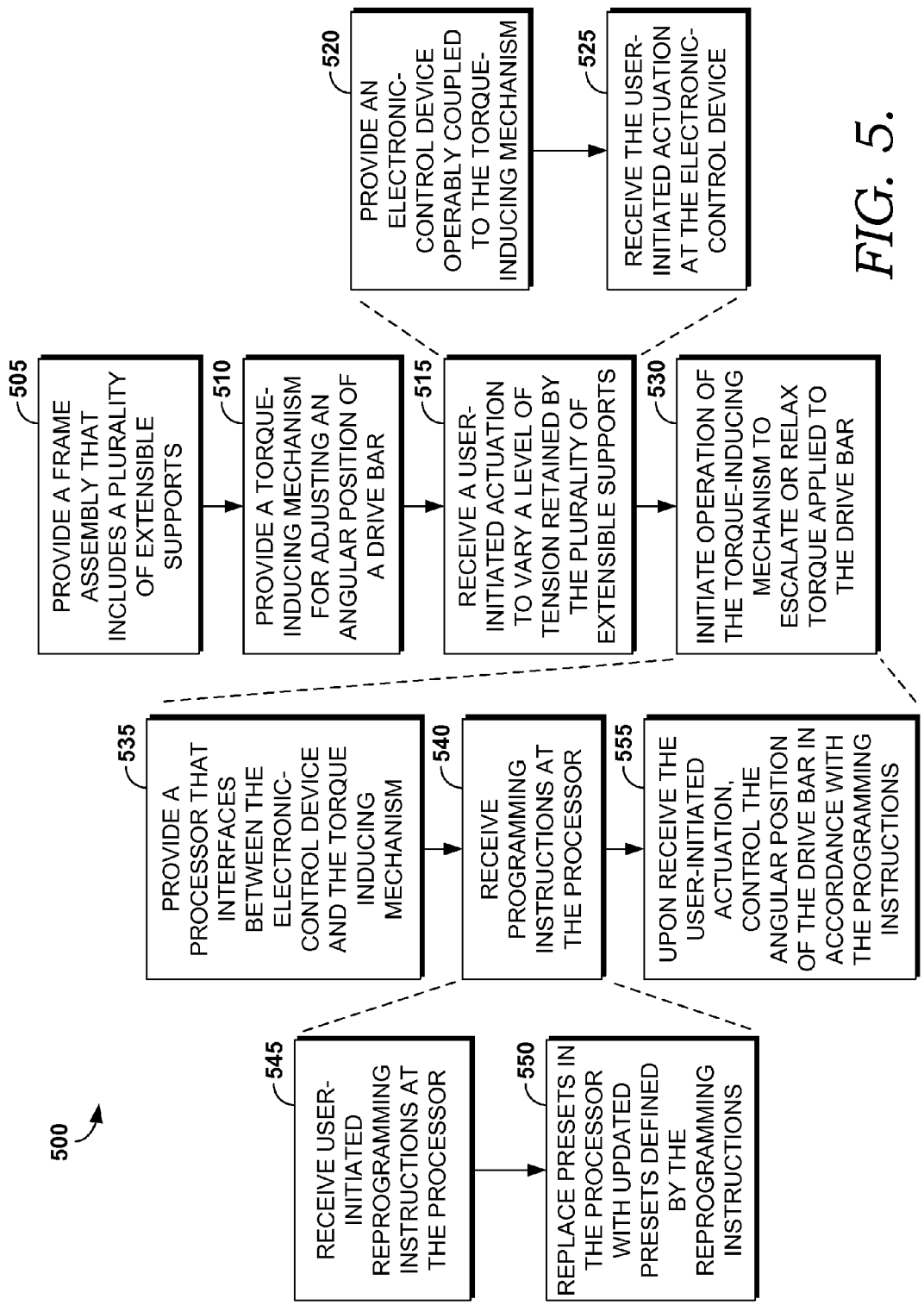
FIG. 5 illustrates an overall flow diagram of a method for adjusting a level of firmness of a seating unit, in accordance with an embodiment of the present invention.

In operation, the occupant may provide a user-initiated actuation to adjust the tension of the extensible supports. This process of adjustment is now described with reference to FIG. 5. Generally, FIG. 5 illustrates an overall flow diagram that depicts an illustrative method 500 for adjusting a level of firmness of a seating unit (e.g., seating unit 100 of FIG. 1), in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described.

Initially, the method 500 for adjusting a level of firmness in the seating unit includes providing a frame assembly (see block 505) and providing a torque-inducing mechanism (see block 510). Typically, the frame assembly (e.g., frame assembly 295 of FIG. 2) includes a plurality of extensible supports (e.g., sinuous wires 220 of FIG. 2, fabric webbing 310 of FIG. 4, or a combination thereof of FIG. 3) having a first end fixedly attached to a stationary member (e.g., forward lateral member 223 of FIGS. 2-4) of the frame assembly and a second end secured to a drive bar (e.g., drive bar 230 of FIGS. 2-4) that is rotatable with respect to the stationary member. Typically, the torque-inducing mechanism (e.g., mechanisms 240, 300, and 400 of FIGS. 2-4, respectively) is provided for adjusting an angular position of the drive bar with respect to the stationary member. As such, the drive bar is configured to convert torque applied by the torque-inducing mechanism into a directional force (aligning with the operative-tension axis 285 of FIG. 2) that controls the longitudinal tension of the extensible supports. As depicted at block 515, a representation of a user-initiated actuation is received. The user-initiated actuation may be any indication expressing that an occupant desires to vary the level of tension retained by the extensible supports. In embodiments, receiving a representation of a user-initiated actuation includes providing an electronic-control device (e.g., wand, control pad in a consol, switch, and the like), which may be operably coupled to the torque-inducing mechanism (see block 520), and receiving the user-initiated actuation at the electronic-control device (see block 525).

As depicted at block 530, operation of the torque-inducing mechanism may be initiated to escalate or relax torque applied to the drive bar. In one instance, initiating operation may include providing a processor (e.g., processor 355 of FIG. 3) that is operably coupled to the electronic-control device and to the torque-inducing mechanism, as depicted at block 535. In this capacity, the processor acts as an interface between devices for manipulating and/or generating instructions sent therebetween. Programming instructions may be received at the processor, which stores at least one preset level of firmness based on the programming instructions, as indicated at block 540. In operation, upon receiving the user-initiated actuation via the electronic-control device, the angular position of the drive bar may be controlled in accordance with the preset level of firmness, as indicated at block 555. In embodiments, receiving programming instructions may include receiving user-initiated reprogramming instructions at the processor via the electronic-control device (see block 545), and replacing the stored preset levels of firmness with updated presets in accordance with the reprogramming instructions.

Figure 6:
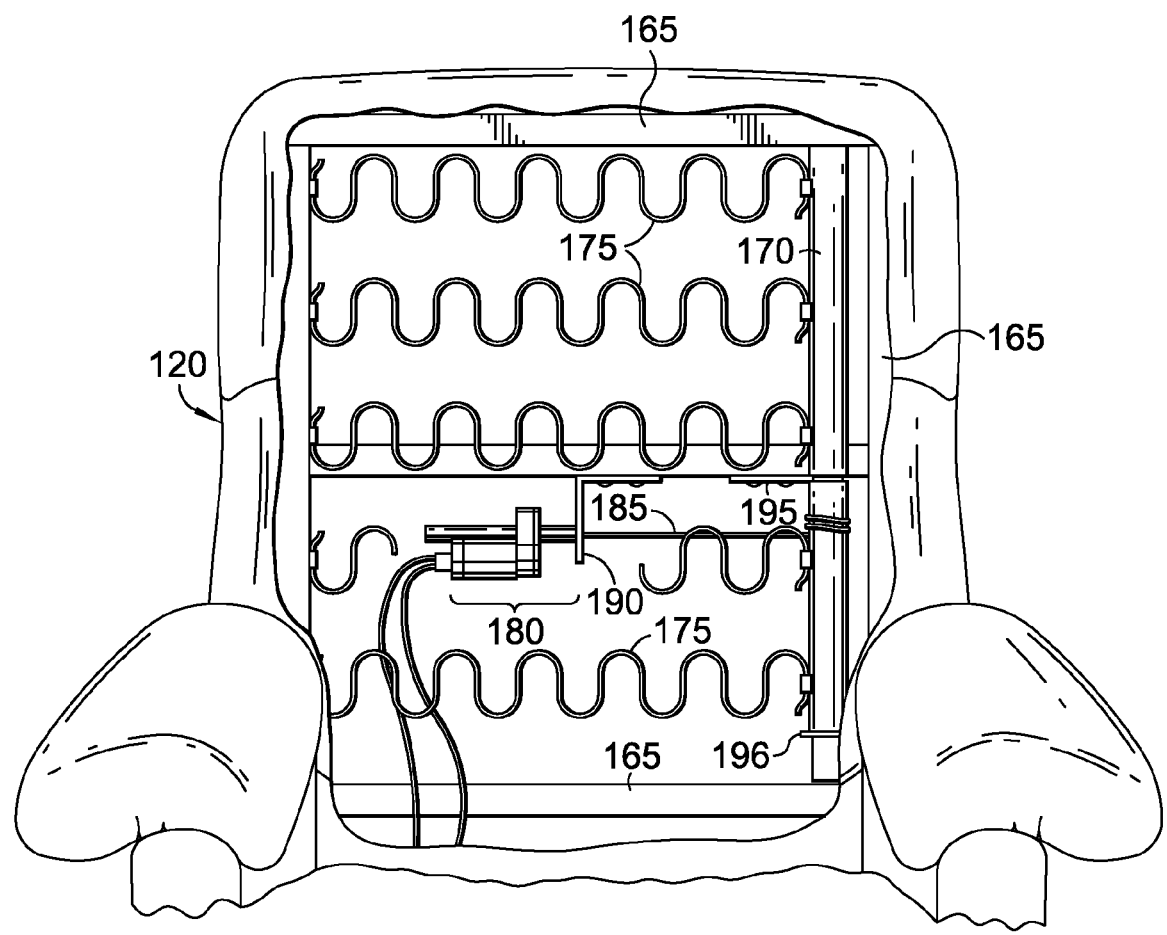
FIG. 6 is an enlarged diagrammatic exterior perspective view of FIG. 1, but with a portion of a backrest cut away for clarity and an adjustable foundation installed therein, where the adjustable foundation is positioned according to a distinct embodiment of the present invention.

Turning now to FIG. 6, an enlarged diagrammatic exterior perspective view of a seating unit is shown. In particular, the seating includes the backrest 120 with a portion cut away of a cushion for clarity to expose an adjustable foundation installed therein. The adjustable foundation is positioned according to a distinct embodiment of the present invention. Specifically, the adjustable foundation involves attaching extensible supports 175 to frame members 165 that are presently installed in the backrest 120 in order to provide the backrest 120 with structure.

Initially, the adjustable foundation includes a plurality of the extensible supports 175, an automated adjustment mechanism 180 (e.g., linear actuator), a drive tube 170, a cable 185 that is moveably coupled to the automated adjustment mechanism 180 and extends to meet the drive tube 170, brackets 190 and 195, and rotational support(s) 196. The extensible supports 175 may vary in number and each of the extensible supports 175 are moveably coupled, at a first end, to one of the frame members 165 installed in the backrest 120. An opposed second end of each of the extensible supports 175 is moveably coupled to the drive tube 170. As discussed above, the moveable coupling may be made by attachment clips (as shown) or any other suitable fastening device. In addition, as discussed above, the extensible supports 175 may be sinuous wire (as shown), webbing, springs, or any other element that is extendable and can retain tension.

In an exemplary embodiment, the frame members 165 may comprise a portion of a frame of the backrest 120. As such, the elements of the adjustable foundation may be provided as a kit that is installed at a chair manufacturer's facility, as opposed to being delivered in a self-contained assembly that is mounted within the frame. The elements of the adjustable foundation may then be installed to the seating unit during fabrication. By way of example, the process of installation may include the following steps: pivotably coupling the drive tube 170 to one or more of the frame members 165 via the rotational support(s) 196; stretching the extensible supports 175 from side to side across the backrest 120; attaching the first end of each of the extensible supports 175 to one of the frame members 165; and attaching the second end of each of the extensible supports 175 to the drive tube 170. The rotational support(s) 196 allow the drive tube 170 to rotate with respect to the frame members 165. In one instance, as discussed more fully below, the drive tube 170 is rotationally controlled by the tension of the extensible supports 175 in combination with the force generated on the cable 185 by the automated adjustment mechanism 180.

The automated adjustment mechanism 180 may be mounted to one or more of the frame members 165 via a bracket 190. Although shown as an L-angled bracket, the bracket 190 may comprise any suitable fastener that is capable of fixedly attaching the automated adjustment mechanism 180 to the backrest 120 and that can withstand static and dynamic lateral forces generated by the automated adjustment mechanism 180. In addition, the bracket 195 may be provided to provide vertical alignment to the drive tube 170 by engaging with a slot therein. The bracket 195 may further provide lateral support to the drive tube 170 by resisting the static and dynamic lateral forces generated by the automated adjustment mechanism 180. Although two different brackets 190 and 195 have been described, it should be understood and appreciated that other types of suitable devices that provide support for the drive tube 170 and automated adjustment mechanism 180 the may be used, and that embodiments of the present invention are not limited to simply those brackets 190 and 195 described herein.

In embodiments, the cable 185 is wrapped directly around the drive tube 170 without the use of a pulley. Typically, the cable 185 is wrapped in a direction about the drive tube 170 such that a lateral force (generated by the automated adjustment mechanism 180) on the cable 185 causes the drive tube 170 to rotate and introduce additional tension into the extensible supports 175. Accordingly, this configuration provides a compact adjustable foundation that provides adjustable lateral support for the back of an occupant of the seating unit at varied levels of firmness.

In operation, the occupant of the seating unit can adjust the firmness of the backrest 120 by manipulating a controller (not shown) that is communicatively coupled (e.g., internally wired) to the automated adjustment mechanism 180. When an occupant manipulates the controller to increase the firmness of the backrest 120, or the firmness of a section of a cushion (shown as a cut away) positioned on the backrest 120, the automated adjustment mechanism 180 is instructed to retract the cable 185. Retracting the cable 185 causes a rotational force, or moment, about the drive tube 170 that, upon the moment overcoming a residual tension in the extensible supports 175, pulls and extends the extensible supports 175 laterally. Consequently, the extension of the lateral supports 175 renders a high level of tension therein and a higher level of firmness in beneath the cushion positioned on the backrest 120.

Conversely, when an occupant manipulates the controller to decrease the firmness behind the cushion positioned on the backrest 120, the automated adjustment mechanism 180 is instructed to extend the cable 185. Extending the cable 185 allows the residual tension in the extensible supports 175 to rotate the drive tube 170 and laterally contract. Consequently, the contraction of the lateral supports 175 renders a low level of tension therein and a lower level of firmness in beneath the cushion positioned on the backrest 120.

As depicted in the FIGS. 1-6, the seating unit may include one or more adjustable foundations (e.g., supporting the seat and/or supporting a cushion in the backrest). In addition, the seating unit may include a second or third adjustable foundation in the seat or the backrest that provides localized adjustable support. In one instance, the localized adjustable foundation may be located in a lumbar region of the seating unit, where the lumbar-region adjustable foundation may be used in conjunction with another adjustable foundation accommodated by the backrest. In this instance, a level of firmness of the lumbar region, such as a lower-back cushion in a car seat, may be adjusted utilizing the lumbar-region adjustable foundation while a firmness of the balance of the backrest is adjustable using the other adjustable foundation (see FIG. 6). In other instances, a second adjustable foundation may provide localized adjustable support in another region of the seating unit where it is desirable to provide more than one level of firmness to properly support the occupant.

With regards to positioning multiple adjustable foundations in a backrest or in a seat, many configurations are considered herein. By way of example, a first and a second adjustable foundation may be placed adjacent to each other, or layered upon one another, when positioned within the backrest. Accordingly, these various adjustable foundations are configured to achieve both general firmness control and localized firmness control.

It should be understood that the construction of the adjustable foundation 150 of FIGS. 2-4 lends itself to enable the various members, brackets, devices, and drive bar(s) to be easily assembled and disassembled from the remaining components of the seating unit 100 of FIG. 1. Specifically, the nature of the pivots and/or mounting locations allows for use of quick-disconnect hardware, such as a knock-down fastener. Accordingly, rapid disconnection of components prior to shipping, or rapid connection in receipt, is facilitated.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. An adjustable foundation of a seating unit having a base structure for suspending the adjustable foundation above an underlying surface, the adjustable foundation comprising:
   extensible supports each having a first end and a second end; and
   a frame assembly for controlling tension of the extensible supports, the frame assembly comprising:
   (a) a forward lateral member that is fixedly attached directly to the first end of each of the extensible supports;
   (b) a rearward lateral member that is in a substantial parallel-spaced relationship with the forward lateral member;
   (c) a drive bar that is rotatably coupled to the rearward lateral member and directly secures the second end of each of the extensible supports such that the extensible supports are directly coupled to the drive bar at a distance from the rearward lateral member,
   wherein the extensible supports span directly between the forward lateral member and the drive bar, and wherein rotation of the drive bar comprises rotation about a central longitudinal axis of the drive bar and direct tensioning applied to of each of the extensible supports directly coupled to the drive bar,
   wherein an amount of tensioning applied to each of the extensible supports corresponds to an amount of rotation about the central longitudinal axis, wherein the central longitudinal axis of the drive bar is substantially parallel with the rearward lateral member, wherein rotation of the drive bar about the central longitudinal axis in a counterclockwise direction of movement towards the rearward lateral member escalates longitudinal tension retained by the extensible supports to increase a desired level of firmness of the adjustable foundation based at least in part on direct contact between each of the extensible supports and the drive bar, and further wherein rotation of the drive bar about the central longitudinal axis in a clockwise direction of movement away from the rearward lateral member relaxes longitudinal tension retained by the extensible supports to decrease a desired level of firmness of the adjustable foundation based at least in part on direct contact between each of the extensible supports and the drive bar,
   wherein rotation about the central longitudinal axis comprises wrapping each of the extensible supports around an outer circumference of the drive bar; and
   (d) a seat supported by the extensible supports, wherein the seat is configured to accommodate a posterior of an occupant of the seating unit, wherein rotation about the central longitudinal axis of the drive bar corresponds to an indication provided by the occupant of the desired level of firmness,
   wherein the drive bar comprises a nonuniform diameter along the central longitudinal axis such that adjustment of a rotational position of the drive bar increases or decreases a longitudinal tension applied to at least two of the extensible supports at an uneven rate,
   wherein the nonuniform diameter of the drive bar comprises a nonuniform cam, wherein an amount of tension of one or more of the extensible supports changes at a first rate of adjustment and an amount of tension of one or more of the extensible supports changes at a second rate of adjustment different than the first rate of adjustment.

2. The adjustable foundation of claim 1, wherein the frame assembly further comprises a pair of opposed pivot brackets each having a mounting area extending from the rearward lateral member and an attachment surface that is fixedly attached to the rearward lateral member such that each mounting area is separate from the rearward lateral member, and wherein the rotatable coupling between the drive bar and the rearward lateral member is formed by rotatably coupling the drive bar to the mounting area of each of the pair of opposed pivot brackets such that the drive bar is substantially disposed therebetween.

3. The adjustable foundation of claim 1, further comprising a control system for adjusting the longitudinal tension retained by the extensible supports, the control system comprising a torque-inducing mechanism that is radially engaged to the drive bar to rotate the drive bar about the central longitudinal axis.

4. The adjustable foundation of claim 3, wherein the torque-inducing mechanism is fixedly attached to the rearward lateral member and is configured to adjust an angular position of the drive bar with respect to the rearward lateral member.

5. The adjustable foundation of claim 4, wherein the torque-inducing mechanism comprises a ratchet device that, upon receipt of manual actuation, advances rotary motion of the drive bar thereby escalating or relaxing torque applied thereto, wherein the ratchet device comprises:
a gearwheel that includes a centrally located opening and radially directed teeth, wherein the gearwheel is radially engaged to the drive bar via the opening; and
a spring-loaded finger that is pivotably coupled to the rear lateral member and that engages with the teeth to prevent unintended rotary motion of the drive bar.

6. The adjustable foundation of claim 4, wherein the control system further comprises an electronic-control device that, upon actuation by an occupant of the seating unit, initiates operation of the torque-inducing mechanism to escalate or relax torque applied to the drive bar.

7. The adjustable foundation of claim 6, wherein the torque-inducing mechanism comprises:
a pulley that includes a centrally located bore that is radially engaged to the drive bar;
a cable that includes a first end connected to the pulley and a second end that is connected to a linear motor, wherein the pulley is circumferentially engaged to a section of the cable; and
the linear motor for applying the torque to the drive bar by exerting a linear draw on the cable.

8. The adjustable foundation of claim 6, wherein the torque-inducing mechanism comprises:
a gear that includes a centrally located opening that is radially engaged to the drive bar; and
a rotary motor with a sprocket output that is drivably engaged to the gear for applying the torque on the drive bar.

9. The adjustable foundation of claim 6, wherein the control system further includes a processor that is operably coupled to the electronic-control device and the torque-inducing mechanism and acts as an interface therebetween, wherein the processor is configured with a memory functionality for storing preset levels of firmness.

10. The adjustable foundation of claim 1, wherein each of the extensible supports comprise fabric webbing, wherein the first end of the extensible supports is fixedly attached to the forward lateral member by wrapping the extensible supports thereabout, and wherein the second end of the extensible supports is secured to the drive bar by inserting the second end into slots that are longitudinally fabricated into the drive bar.

11. The adjustable foundation of claim 1, wherein each of the extensible supports comprises sinuous wire, wherein the first end of the extensible supports is fixedly attached to the forward lateral member by attachment clips, and wherein the second end of the extensible supports is secured to the drive bar by fasteners that allow for rotational movement between the second end and the drive bar.

12. The seating unit of claim 1, wherein the drive bar comprises a cross-section that is non-uniform in radius such that adjustment of an angular position of the drive bar increases or decreases the longitudinal tension of the extensible supports at an uneven rate based on wrapping each of the extensible supports around a nonuniform outer circumference along a length of the drive bar.

13. The adjustable foundation of claim 1, wherein the forward lateral member of the frame assembly is positioned on a front-facing side of the occupant of the seating unit, and wherein the drive bar of the frame assembly is positioned on a back-facing side of the occupant of the seating unit.

14. An adjustable foundation of a seating unit having a base structure for suspending the adjustable foundation above an underlying surface, the adjustable foundation comprising:
extensible supports each having a first end and a second end; and
a frame assembly for controlling tension of the extensible supports, the frame assembly comprising:
(a) a forward lateral member that is fixedly attached directly to the first end of each of the extensible supports;
(b) a rearward lateral member that is in a substantial parallel-spaced relationship with the forward lateral member;
(c) a drive bar that is rotatably coupled to the rearward lateral member and directly secures the second end of each of the extensible supports such that the extensible supports are directly coupled to the drive bar at a distance from the rearward lateral member, wherein the drive bar comprises a nonuniform cam shape that changes along a central longitudinal axis of the drive bar,
wherein the extensible supports span directly between the forward lateral member and the drive bar, and wherein rotation of the drive bar comprises rotation about the central longitudinal axis of the drive bar and direct tensioning applied to of each of the extensible supports directly coupled to the drive bar,
wherein an amount of tensioning applied to each of the extensible supports corresponds to an amount of rotation about the central longitudinal axis of the drive bar and is based on a position where each extensible support is secured along the central longitudinal axis of the drive bar relative to at least a portion of the nonuniform cam shape, such that a rate of increasing or decreasing in longitudinal tension is uneven between at least two of the extensible supports during adjustment of the drive bar based on the nonuniform cam shape of the drive bar where each of the at least two extensible supports is coupled to the drive bar, wherein adjustment of a first extensible support associated with a first portion of the nonuniform cam shape is different than a rate of adjustment of a second extensible support associated with a second portion of the nonuniform cam shape,
wherein the central longitudinal axis of the drive bar is substantially parallel with the rearward lateral member, wherein rotation of the drive bar about the central longitudinal axis in a counterclockwise direction of movement towards the rearward lateral member escalates longitudinal tension retained by the extensible supports to increase a desired level of firmness of the adjustable foundation based at least in part on direct contact between each of the extensible supports and the drive bar, and further wherein rotation of the drive bar about the central longitudinal axis in a clockwise direction of movement away from the rearward lateral member relaxes longitudinal tension retained by the extensible supports to decrease a desired level of firmness of the adjustable foundation based at least in part on direct contact between each of the extensible supports and the drive bar; and
(d) a seat supported by the extensible supports, wherein the seat is configured to accommodate a posterior of an occupant of the seating unit, wherein rotation about the central longitudinal axis of the drive bar corresponds to an indication provided by the occupant of the desired level of firmness.

15. The adjustable foundation of claim 14, wherein based on the rate of adjustment of the first extensible support being different than the rate of adjustment of the second extensible support, the adjustable foundation is configured to provide a zoned effect.

16. The adjustable foundation of claim 1, wherein the increasing or decreasing of the longitudinal tension corresponds to an increasing or decreasing of a level of firmness.

17. An adjustable foundation of a seating unit having a base structure for suspending the adjustable foundation above an underlying surface, the adjustable foundation comprising:
   a plurality of extensible supports each having a first end and a second end; and
   a frame assembly for controlling tension of the plurality of extensible supports, the frame assembly comprising:
   (a) a forward lateral member that is fixedly attached directly to the first end of each of the plurality of extensible supports;
   (b) a rearward lateral member that is in a substantial parallel-spaced relationship with the forward lateral member;
   (c) a drive bar that is rotatably coupled to the rearward lateral member and directly secures the second end of each of the plurality of extensible supports such that longitudinal tension is restrained thereby, said drive bar comprising a nonuniform cam profile that changes along a length of a rotation axis of the drive bar,
   wherein an amount of longitudinal tensioning applied to each of the plurality of extensible supports in response to rotation of the drive bar corresponds to a position where each of the plurality of extensible supports is secured along the nonuniform cam profile of the drive bar.

18. The adjustable foundation of claim 17, wherein the amount of tensioning applied to each of the plurality of extensible supports corresponding to a position along the nonuniform profile comprises:
   an amount of tensioning applied to each of the plurality of extensible supports relative to at least a portion of the nonuniform cam shape, such that a rate of adjustment of a first extensible support associated with a first portion of the nonuniform cam shape is different than a rate of adjustment of a second extensible support associated with a second portion of the nonuniform cam shape.

19. The adjustable foundation of claim 18, wherein based on the rate of adjustment of the first extensible support being different than the rate of adjustment of the second extensible support, the adjustable foundation is configured to provide a zoned effect.

20. The adjustable foundation of claim 17, further comprising:
   a seat supported by the extensible supports, wherein the seat is configured to accommodate a posterior of an occupant of the seating unit, wherein rotation about the rotation axis of the drive bar corresponds to an indication provided by the occupant of the desired level of firmness.

* * * * *